United States Patent [19]

Gwin et al.

[11] Patent Number: 4,556,162

[45] Date of Patent: Dec. 3, 1985

[54] WELD BACKUP MECHANISM FOR INTERNAL PIPE WELDING APPARATUS

[75] Inventors: Richard B. Gwin, New Orleans; Philip H. Manning, Mandeville, both of La.

[73] Assignee: The Babcock & Wilcox Company, New Orleans, La.

[21] Appl. No.: 601,187

[22] Filed: Apr. 17, 1984

[51] Int. Cl.⁴ .......................... B23K 5/22; B23K 9/02
[52] U.S. Cl. ........................................ 228/50; 228/49.2
[58] Field of Search ............... 228/49.2, 50, 212–216; 29/33 T, 272; 279/2 R; 248/590, 597, 607, 608; 269/310, 268

[56] References Cited

U.S. PATENT DOCUMENTS

| | | | |
|---|---|---|---|
| 3,110,277 | 11/1963 | Dixon et al. | 228/50 X |
| 3,937,382 | 2/1976 | Cunningham et al. | 228/50 X |
| 4,254,856 | 3/1981 | Komatsu et al. | 279/2 R |
| 4,363,954 | 12/1982 | Rinaldi | 228/50 X |

FOREIGN PATENT DOCUMENTS 2757693  3/1979  Fed. Rep. of Germany ...... 228/212

Primary Examiner—Kuang Y. Lin
Attorney, Agent, or Firm—Robert J. Edwards; James C. Simmons

[57] ABSTRACT

A weld backup mechanism includes an arcuate backup ring segment spring mounted to a support plate for rotational displacement. A plurality of such mechanisms are fixed to clamping members of an internal line-up clamp for radial expansion and retraction therewith.

9 Claims, 7 Drawing Figures

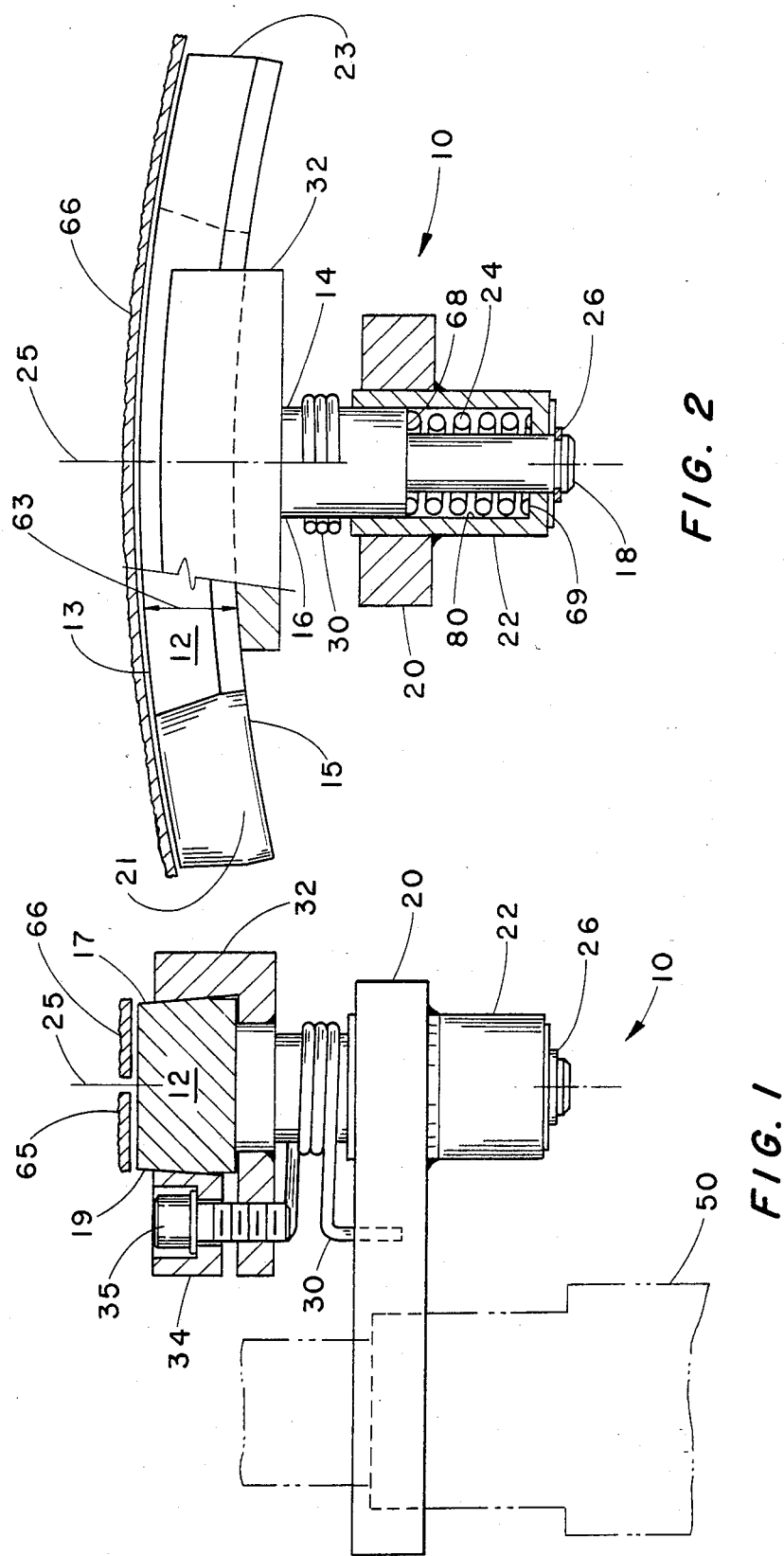

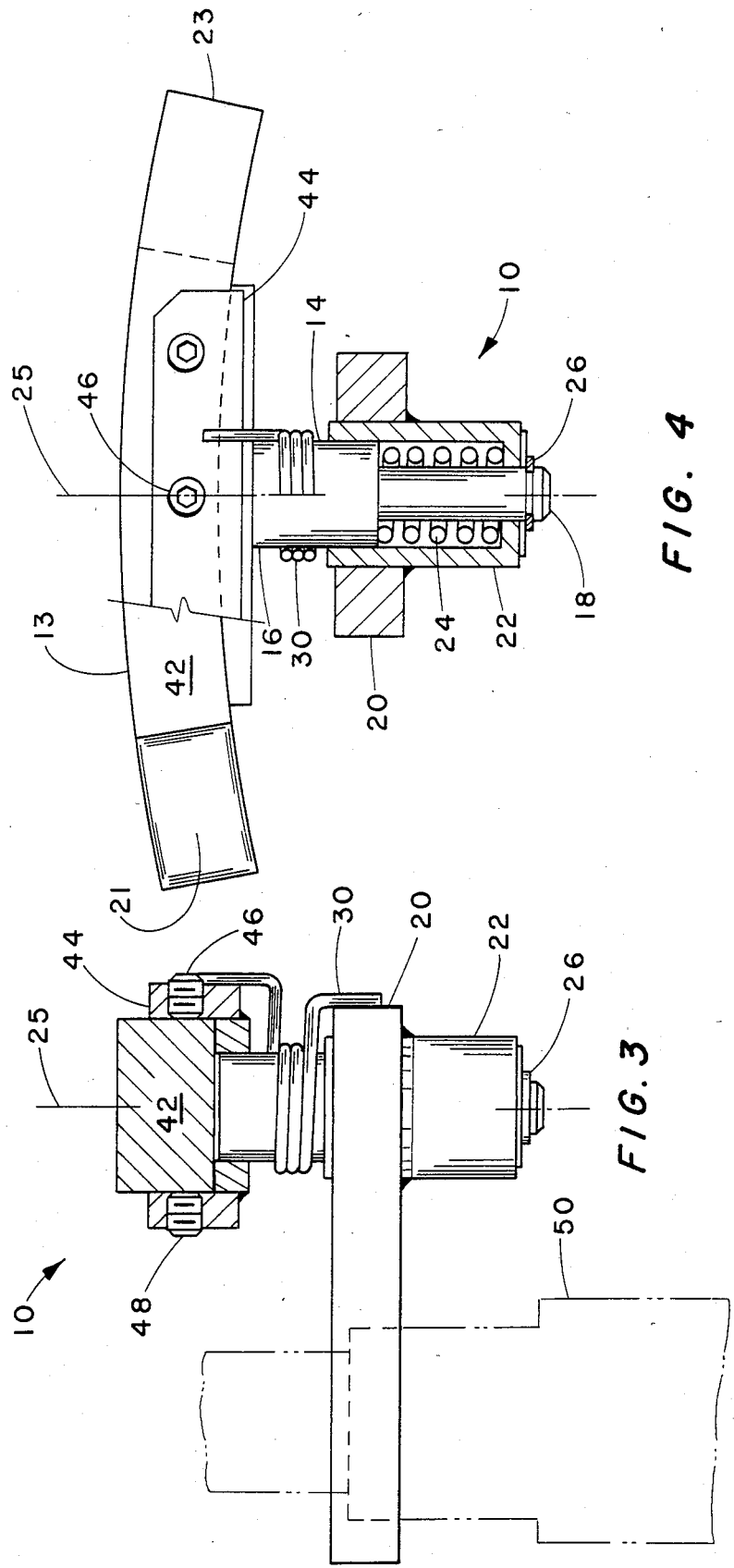

WELD BACKUP MECHANISM FOR INTERNAL PIPE WELDING APPARATUS

This invention relates to an apparatus for girth welding a joint between the ends of adjacent sections of pipe and, more particularly, to a new and improved weld backup mechanism therefor which is adapted for radial movement with an internal pipe line-up clamp.

A weld backup or backing ring, typically composed of copper, is used to back the joint between the adjacent ends of pipe during welding to faclitate obtaining a sound weld at the root of the joint. The weld backup material provides a heat sink against which the molten weld puddle solidifies. To be effective, the backup should fit against the joint uniformly and in a manner wich does not introduce contaminants into the weld area.

In the welding of large diameter pipe sections to pipeline, an internal pipe alignment mechanism, commonly called an internal pipe line-up clamp, is utilized to align the pipe ends for welding. Typically, the internal pipe line-up clamp includes two axially-spaced clamping members composed of sets of arcuate members that are hydraulically or pneumatically operated to radially clamp against and align the internal circumferential surface of the pipe section and pipeline in order to assure that the weld joint is properly positioned.

U.S. Pat. No. 3,937,382 to Cunningham et al discloses an internal pipe line-up clamp provided with a weld backup mounted to a carriage type framework intermediate first and second sets of clamping members, The weld backup mechanism includes a plurality of circumferentially spaced pistons connected to an air-hydraulic system that is operable to effect twoway movement of the pistons for radially expanding and contracting a segmented backup ring. The segmented ring comprises two identical ring portions. Each ring portion includes two hinged segments. The axial face of each terminal end of each ring portion, that is, the face which is intermediate the inner concave and outer convex circumferential surfaces of the ring portion, is wedge-shaped. The wedge-shaped ends of the respective ring portions are designed to come together in a contiguous relationship when the ring portions are in the radially expanded weld backup position.

In such apparatus as that disclosed in the Cunningham et al patent, oil leakage from the hydraulic operating system may contaminate the weld joint area resulting in weld defects. Further, improper interfits of the ring segments may be experienced due to piston or control valve malfunctions. In addition, the fixed curvature of the ninety degree segments may provide a poor fit at the interface of the backup and inner pipe surfaces in cases where the pipe is slightly out of round or has flats or peaks. Malfunctions of the fluid actuating system may be particularly troublesome since operators of the system cannot easily tell whether the backup, which is within the pipe, is in proper position prior to the commencement of welding.

The decrease in thickness of the backing ring in backup systems which employ ring segments with radially tapering cross-sections at the terminal ends may result in an insufficient heat sink for the weld puddle to properly solidify against.

It is an object of the present invention to provide a weld back-up system which provides sufficient heat sink for the weld puddle to properly solidify against.

It is a further object of the present invention to eliminate or reduce oil contamination in the weld joint area.

It is another object of the present invention to provide a good fit between the ring segments of a weld back-up system and the inner pipe surfaces.

It is yet another object of the present invention to reduce the likelihood of malfunctions of the weld backup system.

In accordance with a preferred embodiment of the invention, a weld backup mechanism comprising a backup ring segment is resiliently mounted to a support bracket which is adapted for connection to, and movement with, one of the two sets of axially spaced clamping members of an internal pipe line-up clamp. More particularly, a plurality of the backup mechanisms may be connected to a set of clamping members so that the overall backup ring, which is composed of a plurality of the ring segments, may be properly positioned against the joint to be welded when the clamp is engaged to the pipe.

Each weld backup mechanism includes an arcuate ring segment, a support plate, and means for mounting the ring segment to the support plate and for rotatably biasing the ring segment which means is responsive to a rotational displacement of the ring segment about a radial axis of the arc of the ring segment. The mounting and biasing means preferably is a torsion spring and further preferably includes a post which is radially positioned relative to the arcuate ring segment and spring biased in the radial direction to accommodate variations in the inner surface of the pipe which is to be welded.

Each of the ring segments extends through an arc and terminates in terminal ends which are complementary to respective ends of adjacent ring segments. The ring segments ar positioned with the terminal ends of adjacent ring segments in continuous contact for slidingly rotating against each other about a radial axis while being simultaneously moved in the radial direction. The terminal ends of adjacent ring segments are positioned with their major arcuate axes lying in a common plane when in the expanded weld backup position and with their major arcuate axes skewed or offset relative to the common plane when radially positioned out of the expanded position.

The various features of novelty which characterize the invention are pointed out with particularity in the claims annexed to and forming a part of this specification. For a better understanding of the invention, its operating advantages, and additional objects attained by its use, reference should be had to the accompanying drawings and the following detailed description of preferred embodiments of the invention.

BRIEF DESCRIPTION OF THE DRAWINGS

In the accompanying drawings, forming a part of this specification, and in which reference numerals shown in the drawings designate like or corresponding parts throughout the same, FIG. 1 is a side view, partly in section, of a backup ring segment and support bracket assembly in accordance with a preferred embodiment of the invention;

FIG. 2 is an end view, partly broken away and partly in section, of the assembly of FIG. 1, and in which a ring section is illustrated in perspective;

FIG. 3 is a side view, partly in section, of a backup ring segment and support bracket assembly in accordance with another embodiment of the invention;

FIG. 4 is an end view, partly broken away and partly in section, of the assembly of FIG. 3, and in which a ring segment is illustrated in perspecitve;

DETALED DESCRIPTION OF THE PREFERRED EMBODIMENTS

FIGS. 1 and 2 illustrate a weld backup mechanism 10 embodying the invention. The weld back-up mechanism is connected to a respective clamping member of the internal pipe line-up clamp disclosed in the aforesaid U.S. Pat. No. 3,937,382, the details of which are incorporated herein by reference. The clamping member is illustrated at 50 in FIGS. 1 and 3 of the drawings of this application and at 28 in FIG. 3 of the aforesaid patent. It should be understood, however, that the weld backup mechanism 10 is not limited to use with an internal pipe line-up clamp having the specific structural details of the clamp disclosed in the aforesaid patent.

Figure 5:
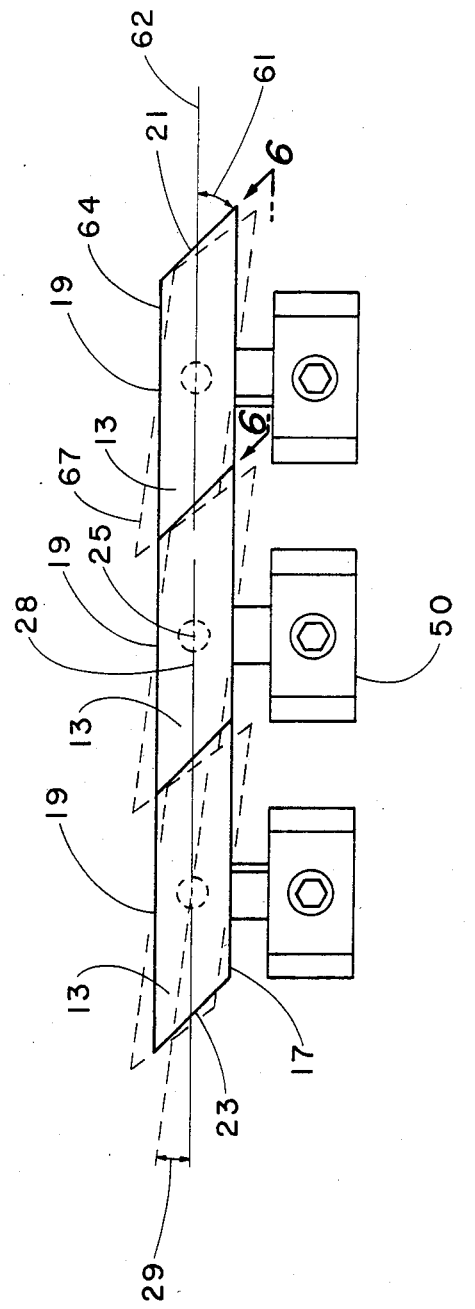
FIG. 5 is a diagrammatic planar representation of the rotational positioning of backup ring segments about radial axes according to the invention.

The backup mechanism 10 includes an arcuate backup ring segment 12 which extends through an arc and terminates in terminal ends that are constructed to be complemental to the terminal ends of adjacent ring segments when the backup ring is in a weld backing position. The arcuate ring segment 12 has a generally convex elongated upper surface 13 for positioning against the circumferentially extending inner surface of a pipe portion, a generally concave elongated lower surface 15 which extends generally parallel to the upper surface 13, elongated lateral faces 17 and 19, and ends or end faces 21 and 23 that are skewed across each of the surfaces 13 and 15 so as to extend at an angle illustrated at 61 in FIG. 5 of about 45 degrees relative to the major arcuate axis, illustrated at 62, of the ring segment, as is best shown in the schematic representation of FIG. 5, to provide wedge-shaped terminal ends whereby the full ring segment thickness, illustrated at 63 in FIG. 2, may be positioned against the joint at each terminal end as well as throughout the segment length to provide sufficient back-up material for the weld puddle to solidify against and whereby the ring segments may be expanded and retracted as hereinafter described. The angle 61 is of course not limited to 45 degrees but may be smaller or larger depending on the requirements of a specific backup mechanism, and can be determined applying engineering principles of common knowledge to one of ordinary skill in the art to which this invention pertains.

Figure 6:
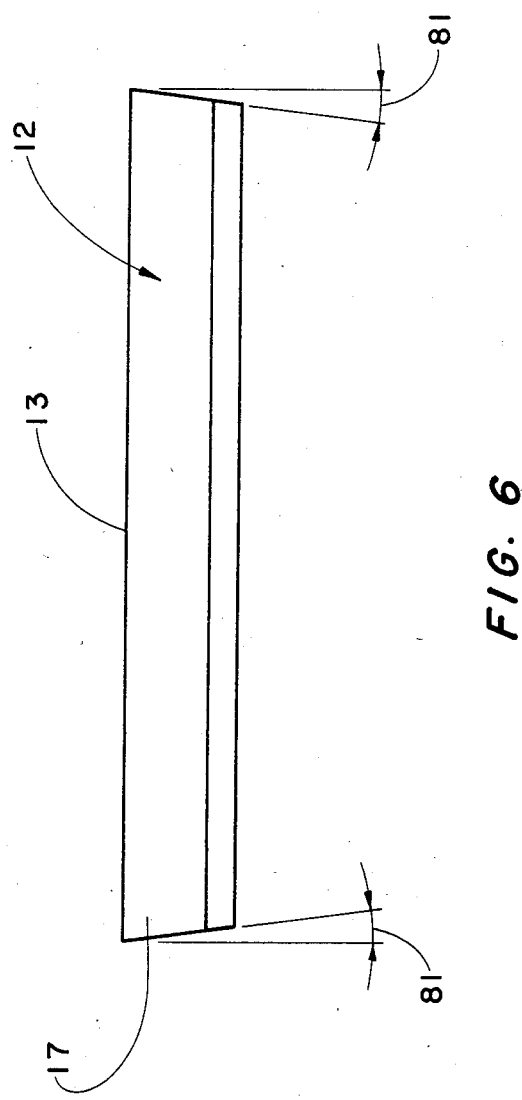
FIG. 6 is an elevation view of a backup ring segment taken along lines 6—6 of FIG. 5 before it is pressed into an arcuate shape.

As illustrated in FIG. 6 wherein, for ease of understanding, segment 12 is shown before it is pressed into its arcuate shape, the end faces 21 and 23 are preferably tapered inwardly by a small angle illustrated at 81 of perhaps 1 to 3 degrees as they extend from the upper to the lower surfaces 13 and 15 respectively to provide continuity of contact of the upper surfaces 13 against a pipe portion by insuring that contact between a pair of ring segments will always occur at the upper surfaces 13.

In operation, a plurality of the weld backup mechanisms 10 are mechanically connected to a clamping member 50 or respective clamping members of an internal pipe line-up clamp for radial movement therewith. A plurality of ring segments 12 are serially mounted in continuous end-to-end contact for rotation about respective radial axes, illustrated at 25, between the radially expanded position, illustrated at 64 in solid line in FIG. 5, in which adjacent terminal ends 21 and 23 are positioned in contiguous relationship over sustantially their entire surfaces with the concave surfaces 13 abutting the interior surfaces of the pipes 65 and 66 at both sides of the joint which is to be welded and with the major arcuate axes 62 of the ring segments lying in a common plane, illustrated at 28 in FIG. 5, which is the radial plane of the joint of the pipe ends, and a retracted position, illustrated at 67 in dashed line in FIG. 5, in which the adjacent ring segments are rotatably displaced about the respective axes 25 such that the adjacent terminal ends 21 and 23 are in contiguous relationship only over a portion of each of their respective surfaces, and the ring segments are skewed or offset relative to each other so that the major arcuate axis 62 of each segment extends in a direction which is at an angle illustrated at 29 of perhaps five or ten degrees relative to the plane 28. The operation of the backup mechanism is described in greater detail hereinafter.

The backup mecanism 10 further includes a support plate 20 and a means comprising preferably a torsion spring 30 and an elongated post 14 for mounting the ring segment 12 to the support plate 20 so that the ring segment is movable relative to the support plate and for biasing the ring segment 12 so that it is rotatable about the radial axis 25 of the arc of the ring segment.

The post 14 extends radially inwardly from the concave lower surface 15 of the ring segment 12. The post 14 is adapted to slidably fit through an aperture 80 in support plate 20 (described hereinafter) to provide radial movement of the ring segment 12 for proper positioning against the inner surface of a pipe. In the embodiment of this invention shown in FIGS. 1 through 4, the alignment post 14 comprises a stepped cylindrical shank including a larger diameter cylindrical stem 16 joined to a smaller diameter cylindrical stem 18 which is centrally mounted to the stem 16 to define a shoulder 68. The smaller stem 18 passes, at its lower end, through the lower end of support plate 20. The support plate 20, which extends transversely relative to the alignment post 14, is suitably mechanically connected to a radially movable clamp member 50 such as a piston rod of an internal pipe clamp by any suitable mechanical means such as, for example, by threaded joints or by screwed connections in accordance with principles of common knowledge to one of ordinary skill in the art to which the invention pertains.

Support plate 20 includes an open-ended cylindrical cup 22. The small stem 18 is extended through an opening in the lower wall 69 of the cup. The ring segment 12 is resiliently biased for radial movement toward and away from the pipe wall by means such as coil spring 24 which is concentrically mounted about a portion of the lower stem 18 in compression and acting between the larger diameter stem shoulder 68 and the lower wall 69 of cup 22. A stop member, such as a retaining ring 26 or threaded nut, is fixed to the free end of the stem 18 outside of the cup 22. Stop member 26 abuts against the outer surface of cup 22 and arrest the upward movement of the post 14 due to the force applied by coil spring 24.

The torsion spring 30 has a central coiled section coaxially positioned about the upper stem 16 and has a first end mounted to the support plate 20 and a second end mounted to the ring segment 12 by means such as apertures in the support plate 20 and ring segment housing 32 respectively, as shown in FIGS. 1 and 2, or by the positioning thereof to bear against the support plate 20 and ring segment housing 44 respectively, as shown in FIGS. 3 and 4.

In the embodiment illustrated in FIGS. 1 and 2, when viewed in a plane perpendicular to the major arcuate axis 62 as shown in FIG. 1, the ring segment 12 has a generally trapezoidal cross-section with the larger base at its lower concave surface 15. Ring segment 12 and post 14 are mounted in housing 32. The ring segment is fixed atop the post 14 in wedged relationship between a complementary surface of the housing 32 at one segment surface 17 and a complementary surface of a backup ring holddown cleat 34 at the other segment surface 19. The cleat is fastened to the housing 32 by cap screw 35 which extends therethrough to screw into the base of housing 32 to cause the cleat 34 to wedgingly engage the ring segment as the screw is tightened.

In the alternative embodiment of FIGS. 3 and 4, ring segment 42 has a generally rectangular cross-section taken in a plane perpendicular to the major arcuate axis 62. Ring segment 42 is connected to channel or U-shaped housing 44 via screws 46 and 48 laterally extending into engagement with the ring segment 42.

The torsion spring 30 acts to rotationally urge the ring segment 12 or 42 about the radial axis 25 toward the position 64 in which the ring segments are circumferentially aligned with each other from the position 67 wherein the segments are skewed relative to the ultimate circumferential position.

The support plate 20 is mounted to a clamping member 50 of an internal line-up clamp which is movable in a radial direction to and away from the inner surfaces of the pipe to be welded and, accordingly, the weld backup mechanism is movable radially therewith so as to thereby reduce the possibility of oil contamination at the weld area or malfunctioning of the weld back-up mechanism resulting in improper positioning of the ring segments against the pipe ends. A plurality of backup ring mechanisms are mounted to selected clamping members so as to form a substantially continuous backup ring throughout the circumferential path of the weld joint.

In operation, a plurality of backup mechanisms are attached to one of the two axially spaced sets of clamping members for radial expansion and contraction with an internal line-up clamp. The weld backup mechanisms are preferably attached to the last set of clamping members which are to be clamped to the pipe. Thus, movement of the clamping members 50 causes movement of the support plates 20 and consequently the backup ring segments 12 or 42 radially outwardly into position against the edges of inner surfaces of the pipes at the weld joint.

A backup ring for welding a pipe includes a series of ring segments 12 or 42 serially mounted in end-to-end relationship through a circumferential path. In a radially retracted position in which the segments 12 are out of engagement with the pipe surface, the segments must all fit into a circumference which is smaller than the circumference in which the segments lie when radially expanded into a position in which the segments engage the inner pipe surface. In the mechanism 10, as the segments are moved radially outwardly through larger circumferences, the torsion springs 30 act to rotate the segments 12 or 42 about the respective axes 25 and into circumferential alignment with each other wherein adjacent terminal ends 21 and 23 are in a contiguous relationship over substantially their entire surfaces. The end faces 21 and 23 are wedge-shaped as previously described to permit the ring segments to extend over increasingly smaller distances in the circumferential direction, that is, in a direction parallel to the weld joint, as the segments are rotated about axes 25 during retraction. The movement of the segments during retraction into increasingly smaller circumferences forces the end faces 21 and 23 to slide against each other against the force of torsion spring 30 to fit within the corresponding increasingly smaller circumferences.

The compression spring 24 provides resilient radial movement of the ring segment 12 or 42 relative to the bracket 20 to allow for pipe diameter variations and provide positive contact of the pipe surface by the ring segments. If such flexibility of movement of ring segments against a pipe surface were not available, breakage of ring segments or other portions of the backup mechanism may occur as they are positioned against the pipe wall.

Figure 7:
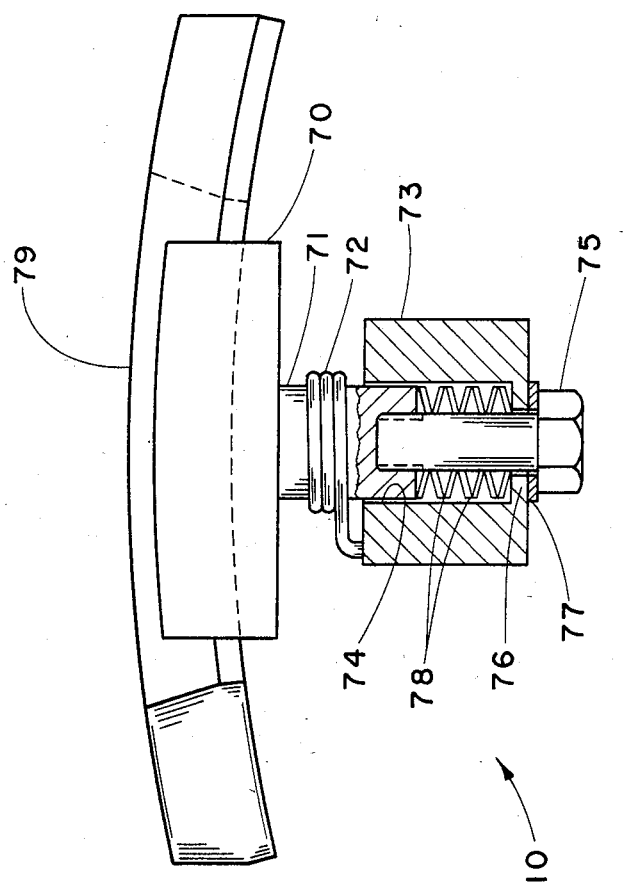
FIG. 7 is an end view similar to that of FIG. 4 of a backup ring segment and support bracket assembly in accordance with yet another embodiment of the invention.

FIG. 7 illustrates an alternative embodiment of the means for exerting a force for resiliently urging a ring segment 79 in a radial direction away from the plate. In this embodiment, there are provided a ring segment housing 70, a post 71 extending radially therefrom, a torsion spring 72, and support plate 73 having an aperture 74 to receive the post similar to the corresponding housing 32, post 14, torsion spring 30, support plate 20, and aperture 80 of FIGS. 1 to 4. While one end of aperture 74 receives the post 71, the opposite end receives a bolt 75 the shank of which extends to and threadedly engages the post 71. The aperture 74 may be narrowed at the end receiving the bolt by a shoulder 76 so that its diameter is only slightly greater than the diameter of the shank of the bolts 75. A washer 77 may be provided for the bolt 75. Around the shank of the bolt 75 between the post 71 and shoulder 76 are provided a plurality of resilient members 78, commonly known as belleville washers, which in unison act as a spring to urge the post 71 radially away from the support plate 73. Such members 78 are non-flat circular washer-like members whose radially outer peripheral portions are raised relative to the center portions thereof in an axial direction thereof. The radially outer portions are positioned adjacent and resiliently bear against corresponding portions of other such members, and the center portions are positioned adjacent and resiliently bear against corresponding center portions of other such members to create in combination a spring effect. The use of belleville washers allows flexibility in providing the degree of spring force desired by merely the addition or subtraction of belleville washers, while the threaded engagement of the post 71 by the bolt 75 allows adjustment of the relaxed position of the post 71.

Since the weld backup mechanism itself does not require a separate air or hydraulic actuating system, the problem of hydraulic oil contamination experienced with prior art arrangements is avoided. Moreover, the attendant need for separate hydraulic system valves and or cylinders, which can malfunction, is also avoided. The ring segments have a full thickness in the radial direction throughout their lengths to provide adequate weld puddle solidification. The use of multiple short ring segments is provided for a better fit between the backup and the inside surface of the pipe to be welded. For example, for welding a pipe with a thirty-six inch diameter, a backing ring may typically comprise twenty ring segments which in the retracted position are aligned oblique to the circumferential direction at an angle of five to ten degrees.

The use of weld backup mechanisms that are mechanically fixed to the clamping members also positively fixes the locations of the ring segments to thereby eliminate doubts of personnel operating the line-up system as to the proper positioning of the backup.

Some features of the present invention can be used to advantage without use of other features of the invention. While specific embodiments of the invention have been shown and described in detail to illustrate the application of the principles of the invention, it is to be understood that the invention may be embodied otherwise departing from such principles.

The embodiments of the invention in which an exclusive right or privilege is claimed are defined as follows:

1. An internal weld backup and pipe line-up clamp device for circumferential welding of cylindrical pipe, the device including a clamp having a plurality of clamping members disposed interiorly of the pipe, means for moving the clamping member in a radial direction to and from the inner surface of the pipe, and a plurality of weld backup ring segments each of which extends through an arc and terminates in termainl ends which are complemental to respective ends of adjacent segments, the improvement comprises support means for connecting at least one of the weld backup ring segments to one of the clamping members for movement therewith in the radial direction between a retracted position in which the ring segments are out of engagement with the inner surface of the pipe and an expanded position in which the ring segments engage the inner surface of the pipe, said ring segments being mounted to the support means and positioned with the terminal ends of adjacent ring segments in continuous sliding contact and adapted to be rotated about the respective radial axes of the respective ring segment arcs while being simultaneously moved in the radial direction, and wherein the major arcuate axes of the ring segments lie in a common plane when the ring segments are in the expanded position and the major arcuate axes of the ring segments extend at an angle to said common plane when the ring segments are out of the expanded position, and further comprising means for urging the ring segments to rotate about the respective axes so that the major arcuate axes of the ring segments lie in said common plane when the ring segments are in the expanded position.

2. A device as claimed in claim 1 wherein said means for urging the ring segments to rotate comprises spring means interposed between the ring segments and the support means.

3. A device as claimed in claim 2 wherein said spring means comprises a torsion spring.

4. A device as claimed in claim 3 wherein said support means comprises a plate fixedly connected to the clamping means, a post projecting in a radial direction between said plate and one of the ring segments, and means for resiliently urging the ring segment in the radial direction away from said plate.

5. A device as claimed in claim 4 wherein said resilient means comprises a plurality of belleville washers positioned in compression between the plate and the post, and bolt means threadly engaging the post for arresting movement of the post in a radial direction from the plate.

6. A device as claimed in claim 4 wherein said resilient means comprises a spring interposed between the plate and the post in compression for biasing the post in a direction to urge the ring segment away from the plate.

7. A device as claimed in claim 6 wherein the post includes a shoulder and the spring comprises a coil spring, the coil spring being in compression and coaxially disposed about the post and engaged with the shoulder.

8. A device as claimed in claim 1 wherein said support means comprises a plate fixedly connected to the clamping means, a post projecting in a radial direction between said plate and one of the ring segments, and means for resiliently urging the ring segment in the radial direction away from said plate.

9. A device as claimed in claim 8 wherein said resilient means comprises a plurality of belleville washers positioned in compression between the plate and the post, and bolt means threadly engaging the post for arresting movement of the post in a radial direction from the plate.

* * * * *